United States Patent [19]
Seymour

[11] Patent Number: 5,012,043
[45] Date of Patent: Apr. 30, 1991

[54] ADJUSTABLE OUTLET BOX ASSEMBLY AND METHOD OF APPLICATION

[76] Inventor: Michael R. Seymour, 3516 N. Clarence, Wichita, Kans. 67204

[21] Appl. No.: 312,716

[22] Filed: Feb. 21, 1989

[51] Int. Cl.⁵ .............................................. H02G 3/08
[52] U.S. Cl. ..................................... 174/57; 324/133
[58] Field of Search ................... 174/57; 220/3.7, 3.92, 220/3.94, 3.4; 324/133; 411/999

[56] References Cited

U.S. PATENT DOCUMENTS

| | | | |
|---|---|---|---|
| 740,663 | 10/1903 | Krantz | 220/3.7 |
| 2,195,975 | 4/1940 | Ribble et al. | 324/133 X |
| 2,573,260 | 10/1951 | Gorman | 220/3.4 |
| 2,707,221 | 4/1955 | Frank | 174/57 X |
| 3,061,083 | 10/1962 | Hubbell | 220/3.4 X |
| 3,414,154 | 12/1968 | Rose et al. | 220/3.7 |
| 3,928,716 | 12/1975 | Marrero | 174/57 |

Primary Examiner—Leo P. Picard
Assistant Examiner—David A. Tone
Attorney, Agent, or Firm—Phillip A. Rein

[57] ABSTRACT

This invention relates to an adjustable outlet box assembly and method of application including an outlet box assembly with a box cover assembly mounted thereon and having a laterally extended receptacle box member to which is attached a variable depth ring assembly. The variable depth ring assembly includes a variable ring member having a keeper plate assembly mounted thereon to enclose adjustment bolt members which are engagable with the receptacle box member and operable to be rotated to provide adjusted movement of the variable ring member relative to the receptacle box member. An adjustable outlet box assembly is provided having a stud anchor plate assembly connectable to a support member and having a variable depth ring assembly connected thereto. A further embodiment utilizes the variable ring member having a groove portion about an outer periphery to receive a fire resistant caulking material therein. The method invention includes connecting an electrical receptacle member to a power supply cable and checking the system prior to installation of the sheetrock or paneling material. The method further provides for covering the electrical receptacle assemblies to prevent contamination and provides for the removal of the subject protective cover members and the adjustment of the variable ring members to place an outer surface thereof in a proper relationship to the installed sheetrock or paneling material.

33 Claims, 5 Drawing Sheets

Fig_1

Fig_2

Fig_3

Fig_27

Fig_28

Fig_30   Fig_29

ADJUSTABLE OUTLET BOX ASSEMBLY AND METHOD OF APPLICATION

PRIOR ART

A patent search on this invention revealed the following U.S. Patents:

| U.S. Pat. No. | Invention | Inventor |
| --- | --- | --- |
| 835,039 | ADJUSTABLE SWITCH BOX | Silas D. Slocum |
| 1,069,777 | SWITCH BOX | William O. Fowler |
| 1,767,339 | JUNCTION BOX FIXTURE | Rhinehart Beerhalter |
| 1,972,794 | OUTLET BOX FOR ELECTRIC INSTALLATION | William W. Reese |
| 2,183,872 | WALL MOUNTING FOR ELECTRICAL DEVICES | Raymond N. Rowe |
| 3,878,315 | ATTACHABLE EXTENSION FOR AN ELECTRICAL OUTLET HOUSING | Jerry F. Blush |
| 3,955,701 | UNIVERSAL EXTENSION FOR OUTLET BOXES | Reinhold Fisch |
| 4,087,624 | FIRE SHIELD FOR ELECTRICAL BOX | Robert A. Hitchcock |
| 4,605,139 | SELF-TARGETING ELECTRICAL OUTLET BOX | Arlen M. Dacar |
| 4,680,426 | ELECTRICAL SWITCHES | Hawker et al |

The Beerhalter, Rowe, Blush, Fowler, and Slocum patents disclose adjustable features on an outlet box.

The Fisch patent discloses adding an additional extension to gain depth to an outlet box.

The Dacar patent discloses the use of a template structure in order to mark the proper position and outline for cutting out paneling or sheet rock before applying same.

The Hitchcock patent discloses the function of a fire shield for an electrical box being slidably constructed so as to variable in width and depth.

The most pertinent patent is Reese in disclosing an outlet box for an electrical installation having an outer adjustable extension portion telescopingly receivable within a fixed outlet box.

PREFERRED EMBODIMENT OF THE INVENTION

In one preferred embodiment of this invention being an adjustable box assembly and method of application, an outlet box assembly is provided including a box cover assembly mounted thereon and having a variable depth ring assembly adjustably mounted on the variable depth ring assembly and operable to receive an electrical receptacle assembly therein. The outlet box assembly is of a conventional type being rectangular or square in shape. The box cover assembly is mounted against the outlet box assembly having a support and cover plate with a receptacle box member integral therewith and extended outwardly therefrom. The receptacle box member is normally operable to receive the electrical receptacle assembly therein. The variable depth ring assembly includes a variable ring member telescopingly mounted on the receptacle box member of the box cover assembly and laterally movable relative thereto. The variable depth ring assembly further includes a keeper plate assembly connected to the variable ring member and operable to receive the electrical receptacle assembly thereagainst. The keeper plate assembly includes a pair of keeper plate members connected to the variable ring member and a plurality of adjustment bolt members which are mounted between the variable ring member and the keeper plate members and into threaded holes within the receptacle box member of the box cover assembly. The keeper plate members are provided with openings whereupon a screwdriver can be used to rotate the adjustable bolt members to move the variable ring member laterally relative to the receptacle box member to position an outer surface of the variable ring member in a common plane with adjacent sheetrock or paneling. In a second embodiment of the adjustable outlet box assembly, a variable depth ring assembly is provided with a clip-on keeper plate assembly. The clip-on keeper plate assembly is of a generally U-shape and is operable to be connected to a variable depth ring member to receive the adjustment bolt members for adjustment of the variable ring member. In a third embodiment of this invention, the variable depth ring assembly is provided with the variable ring member mounted on an outlet receptacle box member and having a ring clip plate member which is readily attachable to the outlet receptacle box member. This ring clip plate member has threaded openings to receive the adjustment bolt members therein for adjustment features. In a fourth embodiment of this invention, an adjustable outlet box assembly is provided having a stud anchor plate assembly with a variable depth ring assembly adjustably mounted thereto. The stud anchor plate assembly is provided with an anchor plate member operable to be mounted against a wood stud by nail members similar to mounting conventional outlet boxes by this method. The variable depth ring assembly includes a variable ring member having a keeper plate assembly connected thereto. A plurality of the adjustment bolt members are mounted between the keeper plate assembly and the variable ring member and extended through threaded openings within the stud anchor plate assembly. The adjustment bolt members can be rotated to adjust the variable ring member relative to the stud anchor plate assembly to provide adjustment relative to an outer surface of the stud member to which sheetrock or paneling is to be connected. In a fifth embodiment of this invention being of a fire resistant type, an adjustable outlet box assembly is provided with the stud anchor plate assembly secured to a stud member and a variable depth ring assembly having a variable depth ring member connected thereto. The variable ring member is provided with an outer peripheral groove portion to receive fire resistant caulking therein to form a sealing with the sheetrock or paneling to be placed thereagainst to meet fire code regulations. In a sixth embodiment of this invention, a safety receptacle box member is provided having an electrical test cover assembly releasably connected thereto. The safety receptacle box member resembles a conventional electrical receptacle box except having indent sections at each corner thereof. The indent sections allow for the adjustable screw members to be placed at each corner thereof and threaded into the stud anchor plate assembly to provide adjustment. The indent sections allow the adjustable bolt members to be on the outside of the electrical receptacle box as not being able to contact any electrical wires therein for the safety feature. An electrical test cover assembly is provided with a main cover body and a power test assembly. The power test assembly is provided with plug members to be inserted in an electrical receptacle and a neon light member which will then provide a visual signal to indicate that power is available to the electrical receptacle member. Another embodiment of a protective cover assembly is provided with a temporary cover plate assembly which is operable to enclose an electrical switch receptacle member to protect same against construction debris. Another provision of this invention is to provide a power circuit test lamp assembly having a power outlet cord connectable to a test lamp member. This is important in checking out three-way switch lighting systems prior to the application of sheetrock or paneling to the ceiling area and adjacent switch areas. A seventh embodiment of this invention is an economical, adjustable outlet box assembly having the box cover assembly with the variable ring member adjustably mounted thereto. A keeper ring assembly is provided having a keeper ring member mounted within openings in the variable depth ring member. This allows for the adjustment bolt members to be extended therethrough and usable with threaded openings in the box cover assembly to provide for the longitudinal adjustment feature of the variable depth ring member being an economical feature of this invention.

The method of application of this invention provides for anchoring an outlet box assembly against a support stud member; connecting a box cover assembly to the outlet box assembly; and adjusting the variable depth ring assembly relative to the box cover assembly so that an outer edge thereof can be positioned so as to be parallel to sheetrock or paneling after installation thereof. The method of this invention further provides for the installation of an electrical receptacle assembly within the variable depth ring assembly and having the electrical conduit wires attached thereto. Thereupon, the continuity of the entire electrical system can be checked prior to installation of the sheetrock or paneling thereabout. The method provides for the adjustment of the variable depth ring assembly to adjust relative to the sheetrock or paneling material as, in certain cases, there have been design changes during the construction process and different thicknesses of sheetrock or paneling than previously expected are installed. The method of this invention allows for the adjustment of the outer surface of the electrical receptacle assembly to its proper position in order to meet fire code regulations. The method of this invention further allows the use of the power circuit test lamp assembly to check out three-way electrical switches and light fixture outlets prior to the application of sheetrock or paneling. The method of this invention also utilizes special cover plate members which can be installed prior to application of sheetrock or paneling and to enclose and protect the various electrical receptacle assemblies being electrical outlets or switch members from dust and debris but allow the sheetrock or paneling to be installed thereabout.

OBJECTS OF THE INVENTION

One object of this invention is to provide an adjustable outlet box assembly which can be mounted against a stud member in a conventional manner and having a variable depth ring assembly connected thereto which can be adjusted laterally relative to the outlet box assembly in order to position same in a proper location for the application of sheetrock or paneling and, more particularly, can be then adjusted after the application of sheetrock or paneling to place an outer surface thereof in an adjacent parallel plane to the outer surface of the sheetrock or paneling to meet fire code regulations.

One further object of this invention is to provide an adjustable outlet box assembly including a variable depth ring assembly adjustably connected to conventionally available outlet box assemblies having an electrical receptacle assembly therein and connected to an electrical power circuit so that same can be tested prior to application of sheetrock or paneling thereabout.

One other object of this invention is to provide an adjustable outlet box assembly having a variable depth ring assembly connected to a box cover assembly which can be readily adjusted laterally therefrom and having various cover plate assemblies which can be connected thereto to indicate continuity in electrical circuit and provide a shield from dust, debris, and the like encountered during a normal building construction process.

One further object of this invention is to provide an adjustable outlet box assembly having a variable depth ring assembly with a variable ring member having an outer periphery groove portion thereabout to receive fireproof caulking therein to abut the adjacent sheetrock or paneling to meet certain fire code regulations.

Still, one further object of this invention is to provide a method of installing an electrical system during the construction process utilizing an outlet box assembly including a variable depth ring assembly connected to a box cover assembly operable to receive an electrical receptacle assembly therein which can be connected to the electrical power supply of the system thus achieving the testing of the entire electrical system including three-way light switch systems prior to installation of the sheetrock or paneling.

Still, one further object of this invention is to provide a method of installing and testing an electrical system in a construction project prior to the installation of sheetrock or paneling including means for adjusting the electrical receptacle assemblies after installation of sheetrock or paneling material to position an outer surface thereof in a proper parallel plane to the adjacent installed material which has not been possible in prior art electrical installation systems.

Various other objects, advantages, and features of the invention will become apparent to those skilled in the art from the following discussion, taken in conjunction with the accompanying drawings, in which:

FIGURES OF THE INVENTION

The following is a discussion and description of preferred specific embodiments of the adjustable outlet box assembly and method of application of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figure 1:
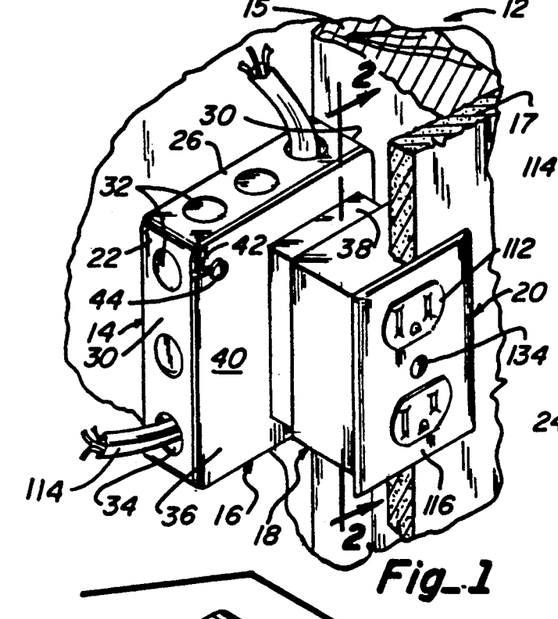
FIG. 1 is a perspective view of an adjustable outlet box assembly of this invention as mounted against a stud member and having sheetrock or paneling mounted adjacent thereto in a finished installed condition.

Referring to the drawings in detail and, in particular to FIG. 1, an adjustable outlet box assembly of this invention, indicated generally at 12, includes (1) an outlet box assembly 14; (2) a box cover assembly 16 releasably connectable to the outlet box assembly 14; (3) a variable depth ring assembly 18 adjustably mounted on the box cover assembly 16; and (4) an electrical receptacle assembly 20 connected to the variable depth ring assembly 18. The adjustable outlet box assembly 12 is operable to be secured to a stud member 15 or other such support members in a conventional manner and having sheetrock or paneling material 17 anchored to the stud member 15 and placed in an abutting position about the variable depth ring assembly 18.

The outlet box assembly 14 is normally in a rectangular or square shape being an electrical box member 22. The box member 22 is provided with a back wall 24 with integral top and bottom walls 26, 28 and opposed parallel side walls 30 to provide the open box type structure. The side walls 30 are provided with conduit plugs 32 mounted within conduit openings 34 in order to extend electrical cable into the electrical box member 22 on selective removal of conduit plugs 32 therefrom.

Figure 3:
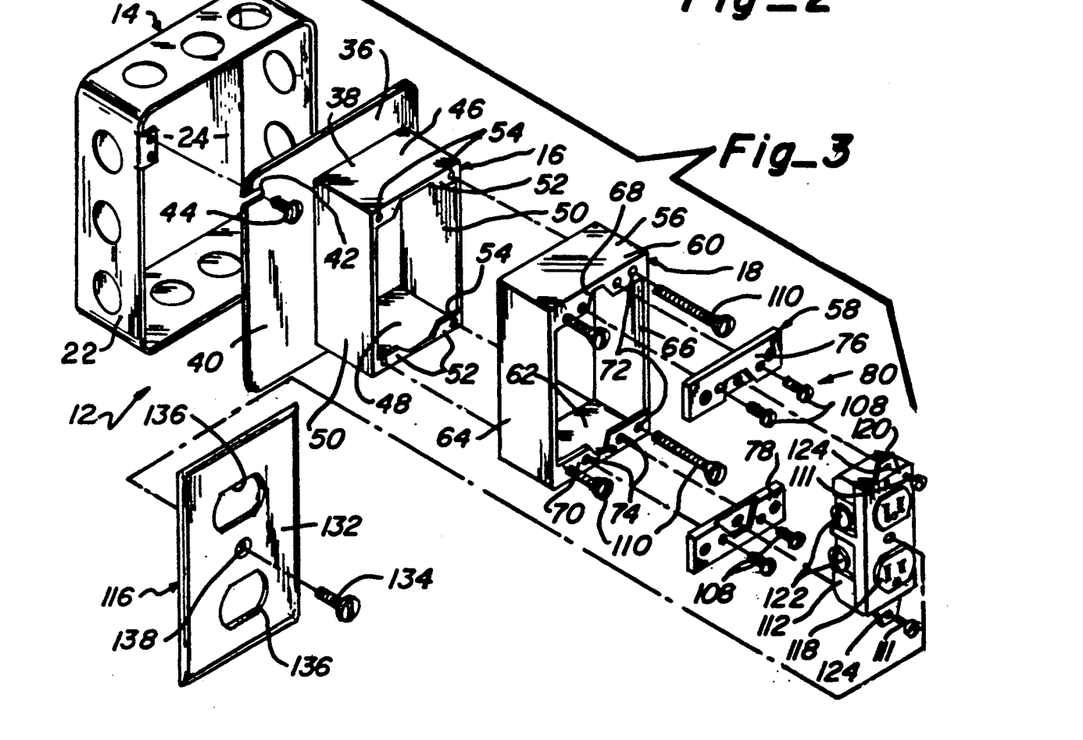
FIG. 3 is an exploded perspective view of the adjustable outlet box assembly of this invention.

As noted in FIG. 3, the box cover assembly 16 includes a support and cover plate assembly 36 having a receptacle box member 38 anchored thereto. The support and cover plate assembly 36 includes a main body 40 having connector slots 42 at opposed corners operable to be secured against the electrical box member 22 by anchor screw members 44.

The receptacle box member 38 is generally of a rectangular shape having a top wall 46, a bottom wall 48, and opposed parallel side wall members 50 interconnecting the top and bottom wall members 46, 48. The box member 38 has rear and front open areas for mounting electrical receptacles therein and providing access of the electrical cable thereto. Adjacent the top and bottom wall members 46, 48 are connector tab members 52 each having a threaded opening 54 therein for reasons to be explained.

It is noted that the outlet box assembly 14 with the box cover assembly 16 mounted therein are available purchase items and do not form an integral part of this invention except in combination with the variable depth ring assembly 18 as will be noted.

The variable depth ring assembly 18 includes a variable ring member 56 having a keeper plate assembly 58 connected thereto. The variable ring member 56 is similar to the receptacle box member 38 having a top wall section 60, a bottom wall section 62, and opposed parallel side wall sections 64, 66 secured to adjacent portions of the top and bottom wall sections 60, 62. The outer adjoining portions of the top and bottom wall sections 60, 62 and side wall sections 64, 66 are provided with upper and lower connector tab sections 68, 70. The connector tab sections 68, 70 are each provided with a pair of spaced adjustment openings 72 and a pair of plate anchor threaded openings 74.

The keeper plate assembly 58 includes a pair of keeper plate members 76, 78 which are releasably connected to the variable ring member 56 by a plate anchor assembly 80.

As noted in FIGS. 5 and 6, the keeper plate members 76, 78 are substantially identical and, therefore, only keeper plate 78 will be described in detail. The keeper plate member 78 includes a keeper body section 82 of a rectangular plate construction having (1) a pair of spaced adjustment bolt opening 84; (2) a pair of spaced plate anchor holes 86; (3) a receptacle threaded anchor opening 88; and (4) a receptacle groove section 90 to receive a portion of the electrical receptacle assembly 20 therein as will be explained.

Figures 4, 5, 6, 7, 8, 9, 10, 11:
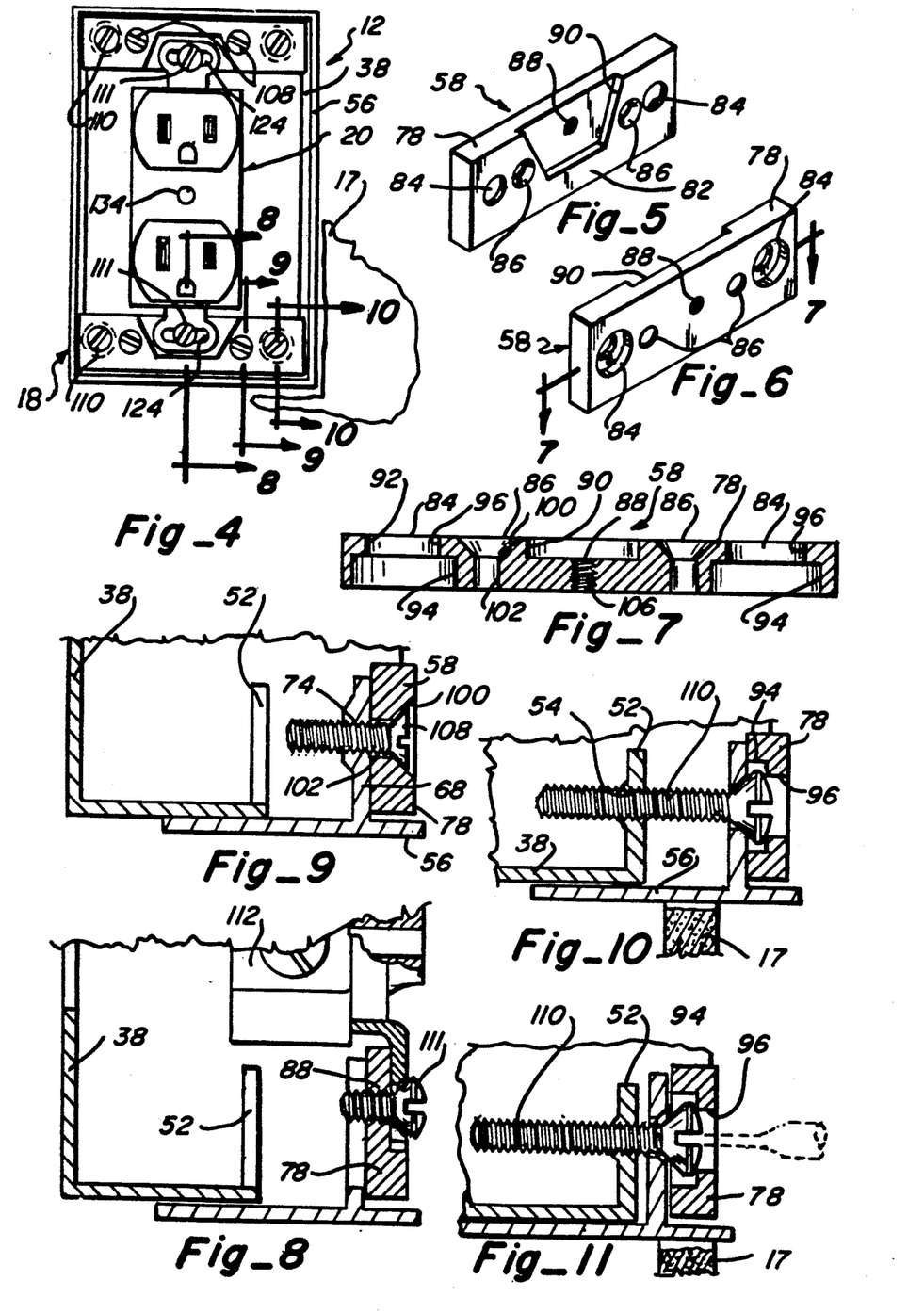
FIG. 4 is a front elevational view of a variable depth ring assembly mounted on a box cover assembly with an electrical receptacle assembly mounted therein shown in a position adjacent a fragmentary portion of a sheetrock or paneling material.
FIG. 5 is a perspective view of a keeper plate assembly of the variable depth ring assembly of this invention.
FIG. 6 is a perspective view of an opposite side of the keeper plate assembly as illustrated in FIG. 5.
FIG. 7 is an enlarged sectional view taken along line 7—7 in FIG. 6.
FIG. 8 is an enlarged fragmentary sectional view taken along line 8—8 in FIG. 4.
FIG. 9 is an enlarged fragmentary sectional view taken along line 9—9 in FIG. 4.
FIG. 10 is an enlarged fragmentary sectional view taken along line 10—10 in FIG. 4.
FIG. 11 is a view substantially identical to FIG. 10 illustrating an adjustment feature of the variable depth ring assembly of this invention.

As shown in FIG. 7, the adjustment bolt opening 84 is provided with a stepped hole section 92 having a bolt cover portion 94 abutting a tool access opening 96. The plate anchor holes 86 are provided with a stepped opening having a tapered section 100 integral with a screw hole 102. The receptacle anchor opening 88 is provided with a threaded hole 106.

The plate anchor assembly 80 includes (1) plate anchor screws 108 adapted to be mounted in respective ones of the plate anchor threaded openings 74; (2) adjustment bolt members 110 operable to be threadably mounted within threaded opening 54 in the receptacle box member 38 as noted in FIG. 10; and (3) receptacle anchor screws 111 mounted within respective receptacle anchor openings 88 as noted in FIG. 8.

On referring to FIG. 4, the electrical receptacle assembly 20 is illustrated as a dual outlet plug-in type of a conventional nature which includes a receptacle member 112 having a power supply conduit 114 connected thereto and a cover plate member 116 mounted on the receptacle member 112.

The receptacle member 112 is provided with plug-in members 118 and having laterally extended anchor tab sections 120. The anchor tab sections 120 are provided with anchor slots 124 to receive the receptacle anchor screws 111 therethrough in a conventional manner.

The receptacle member 112 is provided with terminals 122 to receive electrical wires to provide an electrical power source. As noted in FIG. 2, the power supply conduit 114 has a ground line 126 and power supply lines 128, 130.

The cover plate member 116 is of a conventional rectangular plate shape having a main cover body 132 and used with a cover anchor screw 134 for securing to the receptacle member 112. The cover plate member 116 includes receptacle openings 136 and an anchor opening 138 to receive the cover anchor screw 134 therethrough.

In a second embodiment of this invention as noted in FIGS. 12-15, inclusive, the outlet box assembly 14 is provided with the box cover assembly 16 mounted thereon and having the variable depth ring assembly 18 connected to the box cover assembly 16. The variable depth ring assembly 18 of this embodiment is provided with the previously described variable ring member 56 but having a clip-on keeper plate assembly 140 connected to the variable ring member 56. The clip-on keeper plate assembly 140 is preferrably constructed of a spring steel material in order to provide a biasing feature for a clip-on function.

Figures 12, 13, 14, 15, 16, 17, 18, 19:
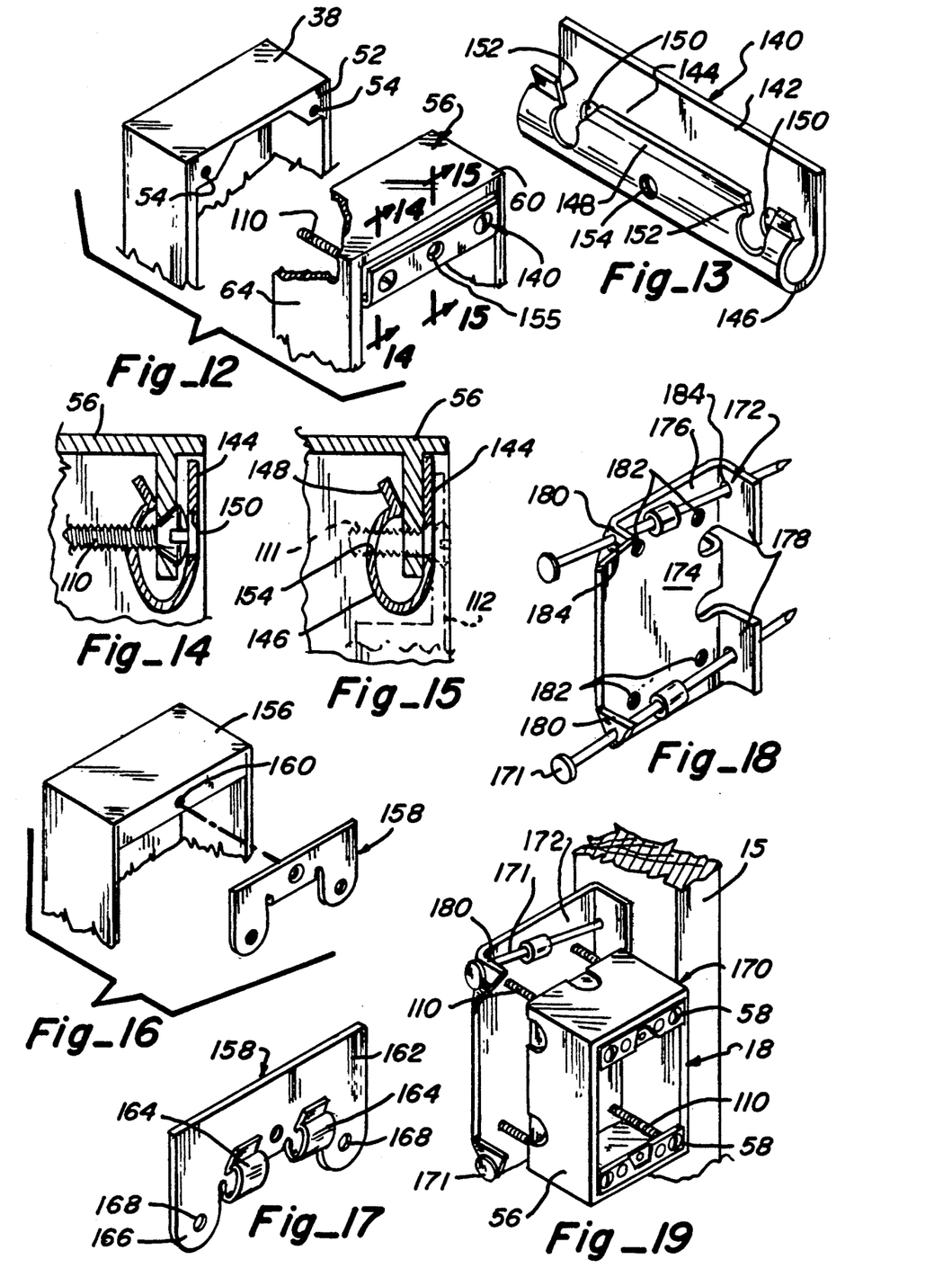
FIG. 12 is a fragmentary perspective view of a second embodiment of the variable depth ring assembly of this invention using a clip-on keeper plate assembly.
FIG. 13 is a perspective view of the clip-on keeper plate assembly.
FIG. 14 is an enlarged fragmentary sectional view taken along line 14—14 in FIG. 12.
FIG. 15 is an enlarged fragmentary sectional view taken along line 15—15 in FIG. 12.
FIG. 16 is a fragmentary perspective view of a third embodiment of the variable depth ring of this invention illustrating a ring clip plate member in an exploded position.
FIG. 17 is an enlarged perspective view of the ring clip plate member noted in FIG. 16 illustrating an opposite side thereof.
FIG. 18 is a perspective view of a stud anchor plate assembly of a fourth embodiment of the adjustable outlet box assembly of this invention.
FIG. 19 is a perspective view of the fourth embodiment of the adjustable outlet box assembly of this invention secured to a stud member.

As noted in FIG. 13, the clip-on keeper plate assembly 140 is of a generally U-shape having a main clip body 142. The clip body 142 is comprised of a main wall section 144 integral with an arcuate wall section 146 which, in turn, is integral with a clip wall section 148. The main wall section 144 is provided with spaced tool access holes 150 for reasons to be explained.

The clip wall section 148 is provided with key shaped slot openings 152 and a central receptacle threaded opening 154 for reasons to be explained.

The clip-on keeper plate assembly 140 is secured to the variable ring member 56 by the plate anchor assembly 80 having the adjustable bolt members 110 extended through the tool access holes 150 and the key slot openings 152. A receptacle anchor screw 111 is operable to extend through an opening 155 in the main wall section 144 and mounted within the threaded opening 154.

A third embodiment of this invention is illustrated in FIGS. 16 and 17 having an outlet receptacle box member 156 with a pair of ring clip plate members 158 connected to upper and lower ends thereof which, in turn, is operable to receive a variable depth ring assembly 18 adjustably mounted thereon.

The outlet receptacle box member 156 is of a conventional nature having an anchor threaded opening 160 at upper and lower portions thereof to receive anchor screws 111 to rigidly secure the ring clip plate members 158 thereto.

The ring clip plate member 158 is provided with a main body section 162; clip sections 164 integral with the main body section 162; anchor ear sections 166 integral and parallel with the main body section 162; and the anchor ear sections 166 having threaded anchor openings 168. The anchor openings 168 are operable to receive a variable depth ring assembly 18 adjustably connected thereto through use of adjustment bolt members 110.

This embodiment of FIGS. 16 and 17 is operable to provide readily attachable ring clip plate members 158 to convert the outlet receptacle box 156 into an adjustable variable depth ring assembly 18 of this invention.

In referring to FIG. 19, a fourth embodiment of this invention utilizes a variable depth ring assembly 18 attached to a stud anchor plate assembly 172 which, in turn, is secured as by nail members 171 to a stud member 15.

As noted in FIG. 18, the stud anchor plate assembly 172 includes an anchor body member 174 of L-shape having a main body section 176 integral with stepped plate sections 178. The main body section 176 is provided with anchor ears 180 and four spaced threaded box anchor openings 182. Each of the anchor ear sections 180 are provided with a connector hole 184 through which is mounted the nail members 171 through similar connector holes 184 in the plate sections 178.

The variable depth ring assembly 18 used with the stud anchor plate assembly 172 is as previously described having a variable ring member 56 and the keeper plate assembly 58. A plurality of the adjustment bolt members 110 are utilized with the variable depth ring assembly 18 and mounted in respective ones of the threaded box anchor openings 182 in the stud anchor plate assembly 172 to acheive an economical adjustable feature of this invention.

Figures 20, 21, 22, 23, 25:
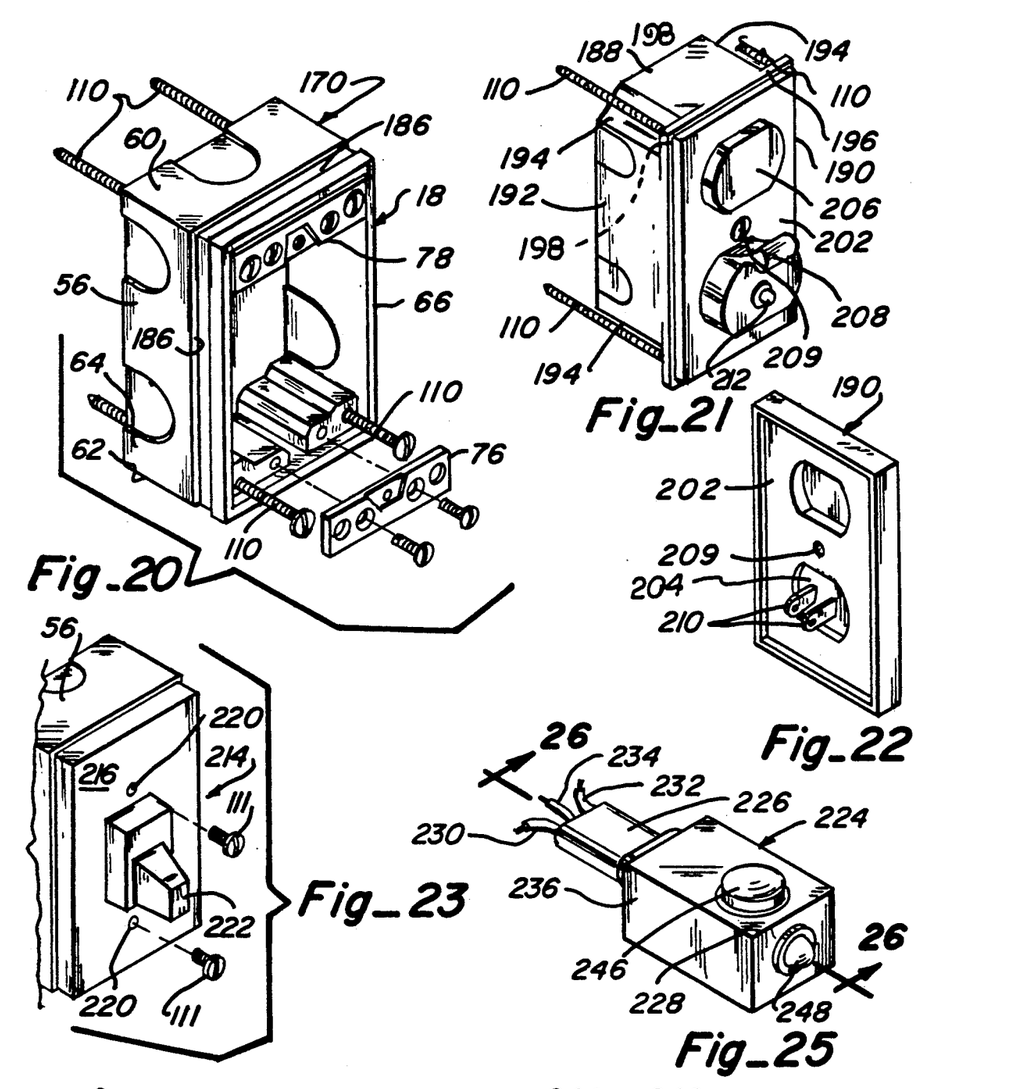
FIG. 20 is a perspective view illustrating a fifth embodiment of the adjustable outlet box assembly of this invention.
FIG. 21 is a perspective view of a sixth embodiment of the adjustable outlet box assembly illustrating a safety receptacle box member of this invention.
FIG. 22 is a perspective view of an electrical test cover assembly.
FIG. 23 is a fragmentary perspective view of a protective temporary cover plate secured to the variable depth ring member of this invention.
FIG. 25 is a perspective view of a power circuit test lamp assembly as connected to a power inlet cord.

A fifth embodiment of this invention is illustrated in FIG. 20 being of a fire resistant type utilizing the previously described adjustable outlet box assembly 170 which can be utilized with the stud anchor plate assembly 172 and the variable depth ring assembly 18. The variable depth ring assembly 18 has the previously described variable ring member 56 with a top wall section 60, bottom wall section 62, and side wall sections 64, 66. The main difference in the variable ring member 56 is that it is provided with an integral groove portion 186 extended about an outer periphery and adjacent a front edge thereof. The groove portion 186 is operable to receive a fire resistant caulking compound therein to seal against an adjacent sheetrock or paneling 17. This embodiment is especially important when required to meet certain fire code regulations.

In a sixth embodiment of this invention as illustrated in FIGS. 21 and 22, a safety receptacle box member 188 is provided having an electrical test cover assembly 190 mounted thereon. The safety receptacle box member 188 constructed of a non-electrical conductive material such as plaster includes a main conduit box 192 having at each corner thereof an indent section 194 and a laterally extended tab section 196. Each tab section 196 is provided with an anchor hole 198 to receive an adjustment bolt member 110 therethrough. The function of the indent sections 194 is so that the adjustment bolt members 110 can be attached to the stud anchor plate assembly 172 of FIG. 18 to provide for the adjustment feature thereof but having the adjustment bolt members 110 removed from the interior of the main conduit box 192. Therefore, the adjustment bolt members 110 are removed from any possible contact with any electrical wires which may become loose due to vibration, movement, or the like and, therefore, provides a safety feature.

The electrical test cover assembly 190 includes a main cover body 202 having a power test assembly 204 connected thereto. The main cover body 202 is provided with receptacle cover sections 206 operable to mount about similar shaped portions in a receptacle member 112 of the electrical receptacle assembly 120. The lower receptacle cover section 206 is provided with a pull tab portion 208 operable for ease of holding and removing the entire test cover assembly 204.

The main cover body 202 is provided with an anchor hole 209 for securing to the receptacle member 112 by a receptacle anchor screw 111.

The power test assembly 204 is provided with prongs or plug members 210 adapted to be placed in similar shaped openings in a plug-in member 118 of a receptacle member 112. The power test assembly 204 through the plug members 210 is operable to illuminate a neon light member 212 connected thereto when the receptacle member 112 has been connected to a power supply conduit 114 to provide electrical energy thereto. The important features of the electrical test cover assembly 190 are (1) to provide illumination from the neon light member 212 to ascertain whether an electrical power circuit is complete and available at this point in the system; and (2) having a main cover body 202 which is adapted to be placed about and aligned with the outer periphery of the safety receptacle box assembly 188. This second feature permits application of the sheetrock or paneling 17 thereabout while still maintaining an airtight, dust-free, connection thereto so that a building construction process can proceed without contamination of the electrical system.

Figures 24, 26:
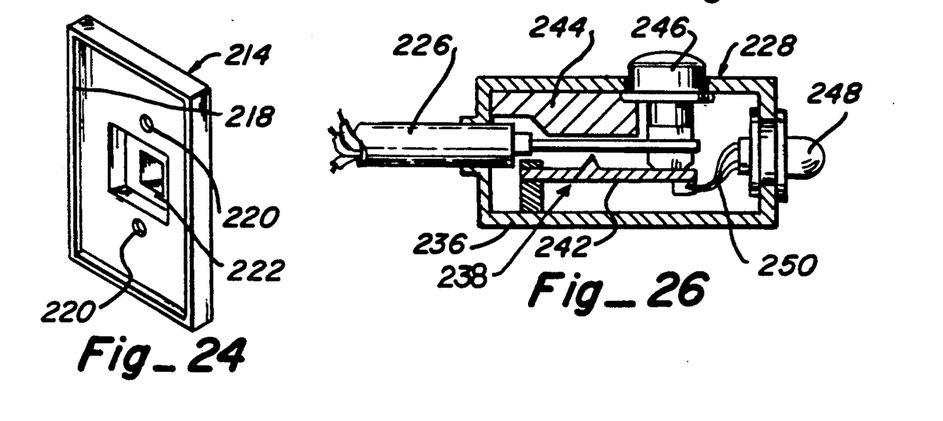
FIG. 24 is a perspective view of the temporary cover plate assembly illustrated in FIG. 23.
FIG. 26 is an enlarged sectional view taken along line 26—26 in FIG. 25.
Figure 27:
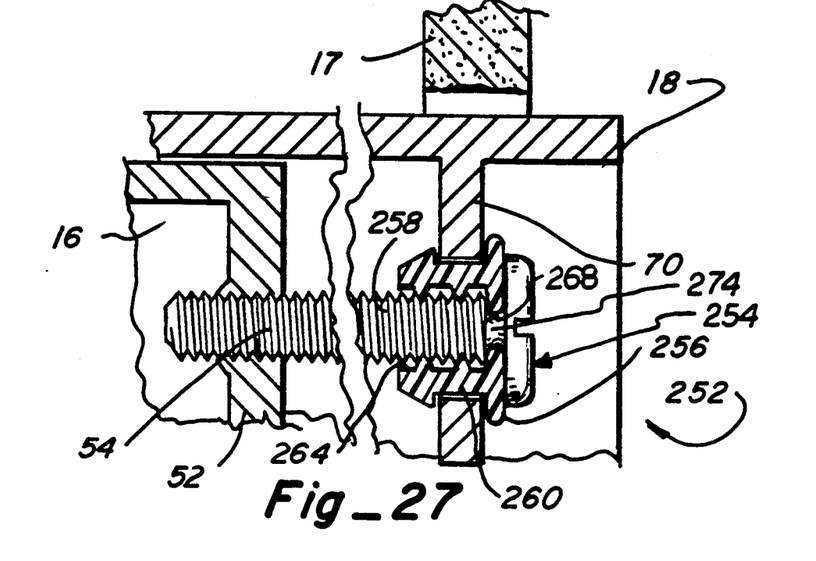
FIG. 27 is a fragmentary sectional view of a seventh embodiment of an economical adjustable outlet box assembly of this invention.
Figure 28:
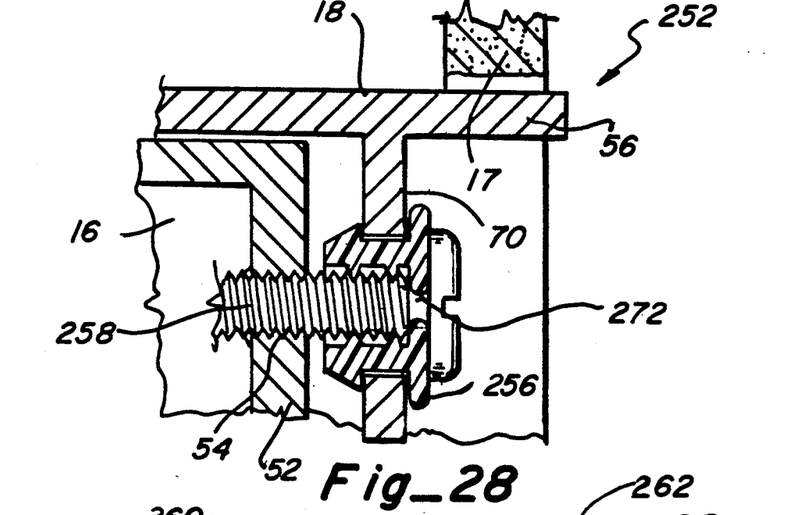
FIG. 28 is a sectional view identical to FIG. 27 except illustrating an adjustment feature thereof.

As noted in FIGS. 23 and 24, a temporary cover plate assembly 214 is provided which is similar in function to the electrical test cover assembly 190 of FIG. 22. The temporary cover plate assembly 214 is operable to cover a normal on/off switch member of a receptacle member 112. The temporary cover plate assembly 214 includes a cover main body 216 having outer peripheral edge section 218; a pair of spaced anchor holes 220; and a switch cover projection 222. The anchor holes 220 are adapted to receive receptacle anchor screws 111 therethrough to anchor to a receptacle member 112 in a conventional manner.

The outer peripheral edge section 218 of the temporary cover plate assembly 214 is operable to abut and be parallel with an outer peripheral surface of the variable ring member 56 to prevent debris from entering thereto but allowing the sheetrock or paneling 17 to be mounted thereabout. A novel feature of the temporary cover plate assembly 214 which can be rotated 180 degrees so that the switch cover projection 222 will hold the on/off switch member of the receptacle member 112 in either an on or off condition.

As noted in FIGS. 25 and 26, a power circuit test line assembly 224 is provided having a power inlet cord 226 connected to a test lamp member 228. The power inlet cord 226 is provided with inlet lines 230, 232 and 234.

As noted in FIG. 26, the test lamp member 228 is provided with a main housing assembly 236 having a cord anchor assembly 238 mounted in the main housing assembly 236 and a test light assembly 250 operably connected to the cord anchor assembly 238. The cord anchor assembly 238 is provided with connector prongs 242 which are electrically connected to the test light assembly 250. The cord anchor assembly 238 further includes a connector block 244 operably connected to an actuator button 246. The actuator button 246 is operable to be manually depressed to move the connector block 244 downwardly so as to provide contact of the adjacent wires 230, 232 and 234 to provide an electrical connection through the connector prongs 242 to the test light assembly 250. The test light assembly 250 includes a test light 248 which would be illuminated on electrical power supplied to the power inlet cord 226.

The power circuit test lamp assembly 224 is operable to be connected to an electrical power inlet cord 226 in a location where, perhaps, a light fixture would be installed in order to check out the electrical continuity in, more particularly, three-way light fixture systems. This is an important feature as errors commonly occur in properly wiring a three-way light fixture installation and the fact that the electrical continuity in the system can be checked out before installation of sheetrock or paneling 17 is an important feature of this invention.

Another embodiment of this invention is shown in FIGS. 27–30, inclusive, being an economical adjustable outlet box assembly 252 utilizing the previously described box cover assembly 16 having a variable depth ring member 18 connected thereto and having a new keeper ring assembly 254 usable therewith. The variable depth ring member 18 includes the previously described variable ring member 56.

Figure 29:
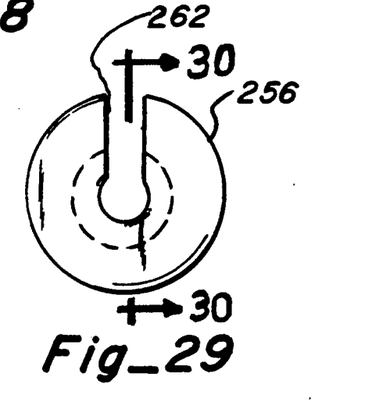
FIG. 29 is a front elevational view of a keeper ring member of the economical adjustable outlet box assembly of this invention.
Figure 30:
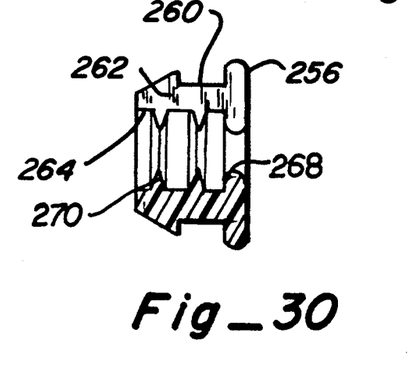
FIG. 30 is a sectional view taken along line 30—30 in FIG. 29.

The keeper ring assembly 254 includes keeper ring members 256 each usable with an adjustable bolt member 258 which is mountable within a threaded opening 54 in each outer corner of the box cover assembly 16.

Each keeper ring member 256 is provided with a ring body member 260 having a split ring opening 262 so as to be readily mountable within an adjustment opening 72 in the variable depth ring member 18.

Each main ring body section 260 is provided with a bolt opening 264 and a head section 268. The bolt opening 264 is provided with bolt contact flanges 270 to grasp the adjustable bolt member 258 when extended therethrough. The adjustable bolt member 258 is provided with a ring groove section 274 to be grasped by a portion of the adjacent head section 268 to hold against axial movement thereof. It is noted that four of the keeper ring members 256 are utilized at each corner of the variable depth ring member 56 so as to provide for lateral adjustable movement of the variable ring member 56 relative to the box cover assembly 16.

USE AND OPERATION OF THE INVENTION

In the use and operation of the adjustable outlet box assembly and method of application 12 of this invention, an outlet box assembly 14 is secured as by nails, screws, or other means, for example, a vertical side wall of the stud member 15 as noted in FIG. 1.

The box cover assembly 16 is connected to the outer open surface of the outlet box assembly 14 through the connector slots 42 and the anchor screw members 44 in a conventional manner. The combination of the outlet box assembly 14 and cover box assembly 16 is operable to allow the electrical power supply conduit 114 to be trained therein for subsequent use thereof.

Next, the variable depth ring assembly 18 is operable to be telescopingly mounted about the receptacle box member 38. Then, the adjustment bolt members 110 are inserted through the respective adjustment openings 72 in the respective connector tab sections 68, 70. The elongated adjustment bolt members 110 can then be threaded within the threaded openings 54 in the receptacle box member 38.

Then, the variable ring member 56 can be moved outwardly to place the heads of the adjustment bolt members 110 against the respective connector tab sections 68, 70. The keeper plate assembly and, more particularly, the respective keeper plate members 76, 78 are then placed against their respective connector tab sections 68, 70 and secured thereagainst through use of the plate anchor screws 108.

Next, the electrician can utilize a conventional screwdriver by inserting same through the tool access openings 96 in the respective keeper plate members 76, 78 to engage an adjustment bolt member 110. Then clockwise rotation of respective adjustment bolt members 110 would adjust each corner separately and move the entire variable ring member 56 inwardly about the receptacle box member 38 a desired distance. More particularly, to a position placing an outer surface of the variable ring member 56 in a location so as to be flush or slightly outwardly with the sheetrock or paneling 17 when mounted thereabout. This adjustment feature is illustrated in FIGS. 10 and 11 with an outer surface of the variable ring member 56 extended slightly outwardly from the sheetrock or paneling 17 in order to receive the cover plate member 116 thereagainst as noted in FIG. 2.

It is also noted that, on rotation of the adjustment bolt members 110 in a counterclockwise direction, the outer head portions thereof contact the adjacent surface of the bolt cover portions 94 to move the variable depth ring assembly 18 outwardly to a desired adjusted position. Therefore, it is seen that the keeper plate assembly 58 allows for the positive adjustment movement of the variable depth ring assembly 18 in both inwardly and outwardly directions.

Figure 2:
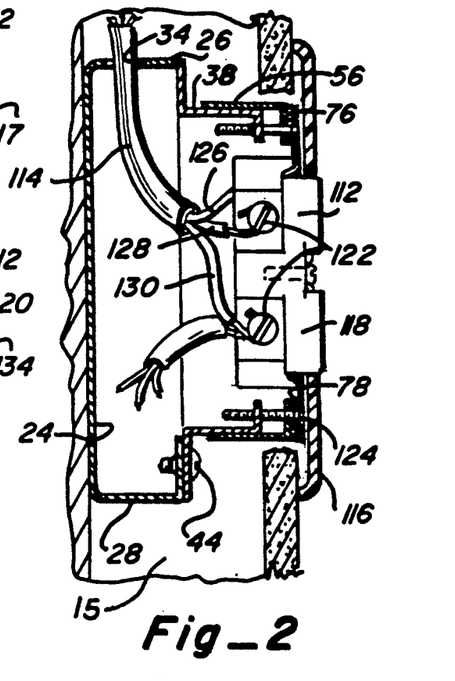
FIG. 2 is an enlarged fragmentary sectional view taken along line 2—2 in FIG. 1.

At this time, after adjusting the variable depth ring assembly 18, the receptacle member 112 can be connected to the power supply conduit 114 as noted in FIG. 2. Then, the receptacle member 112 has its anchor tab sections 120 placed within the receptacle groove sections 90 and secured thereto by the receptacle anchor screws 111 as noted in FIG. 4.

It is noted that, before the installation of the sheetrock or paneling 17, the cover plate member 116 can remain disconnected from the receptacle member 112 and an electrical conduit continuity test can be made of all the installed switch members, electrical outlet members, or similar type structures prior to the installation of the sheetrock or paneling 17. This is an important feature of this invention to allow the installation and checking of electrical circuits prior to installation of sheetrock or paneling 17 which prevents labor and monetary losses in having to later tear out the sheetrock or paneling 17 to find and repair a bad circuit.

After testing electrical circuits, it is noted that an electrical test cover assembly 190 (FIG. 21) or a temporary cover plate assembly 214 (FIG. 24) can be installed upon and against the respective variable ring members 56 as noted in FIGS. 21 and 23. The temporary cover plate assembly 214 and the electrical test cover assembly 190 are constructed to have an outer periphery in the same plane or slightly inwardly from the outer peripheral of the respective abutting variable ring members 56. This is important so that it does not interfere with the later placing of the sheetrock or paneling 17 thereabout.

After the sheetrock or paneling 17 has been installed, the electrician may then return to inspect the various adjustable outlet box assemblies 12 in order to ascertain whether an outer surface of the variable depth ring assemblies 56 are positioned abutting or slightly outwardly of an adjacent outer surface of the sheetrock or paneling 17. If the variable depth ring assembly 18 is not properly positioned, it is obvious that it would be easy for the electrician to use a screwdriver on the adjustment bolt members 110 in each variable depth ring assembly 56 so as to position the same properly relative to the adjacent sheetrock or paneling 17.

After proper adjustment, it is obvious that the respective cover plate members 116 can be installed on the respective receptacle members 112 in contact with an adjacent portion of the sheetrock or paneling 17 (FIG. 2).

As noted in FIGS. 12-15, another embodiment utilizes a special clip-on keeper plate assembly 140 which can be attached to the connector tab sections 68, 70 of the variable ring member 56. The clip-on keeper plate assembly 140 is adapted to be snapped thereon and surround the respective adjustment bolt members 110 to provide for an adjustment feature of the variable ring member 56 relative to the receptacle box member 38.

In FIG. 16, the ring clip member 158 can be attached as by a receptacle anchor screw 111 to the outlet receptacle box member 156. The ring clip member 158 is provided with threaded ring anchor openings 168 to receive the adjustment bolt members 110 therein to provide for an adjustment of a variable ring member 56 relative to the outlet receptacle box 156.

As noted in FIGS. 18 and 19, this embodiment provides another economical method of installation of a variable ring member 56 to achieve adjustment features. More specifically, the adjustment outlet box assembly 170 is provided with a stud anchor plate assembly 172 which is secured as by nail members 171 to the stud member 115 as noted in FIG. 19.

Next, the variable depth ring assembly 18 including the keeper plate assembly 58 mounted thereon as previously described is operable to hold the adjustment bolt members 110 therein. The adjustment bolt members 110 are mounted in respective threaded box anchor openings 182 in the stud anchor plate assembly 172 as noted in FIG. 19. It is obvious then that the respective adjustment bolt members 110 can be rotated to move the entire variable ring member 56 relative to an outer surface of the stud member 15 to place in the proper position outwardly therefrom to allow for the placement of a selected thickness of sheetrock or paneling 17 thereabout.

As noted in FIG. 20, an adjustable outlet box 170 is operable to be mounted against the stud anchor plate assembly 172 in a manner similar to that noted in FIG. 19. The main difference is that this is a fire resistant embodiment whereupon the variable ring member 56 is provided with a groove portion 186 about a periphery thereof. The groove portion 186 is operable to receive a fireproof caulking material therein so as to completely seal the area between the abutting portion of sheetrock or paneling 17 for a safety function. The provision of the groove portion 186 allows an electrician to meet and exceed fire code regulations as far as zero gap between the variable ring member 56 and the adjoining abutting portions of the sheetrock or paneling 17.

In certain cases, it is important that the interior of an electrical outlet box having an electrical receptacle and power supply conduit therein not have any chance of obtaining contact with a metallic member which would cause electrical shock and, perhaps, fire. This problem is addressed by the safety receptacle box member 188 as noted in FIG. 21. The main conduit box 192 may be constructed of a plastic fireproof material and having the indent sections 194 at each corner thereof allows for the insertion of the adjustment bolt members 110 through anchor holes 198 in the tab sections 196. These adjustment bolt members 110 can then be attached to the stud anchor plate assembly 172 secured into the stud member 15 as noted in FIG. 19. This assures that shorting of electrical wires within the main conduit box 192 will not strike any flammable material to provide an important safety feature nor contact the adjustment bolt members 110 which may heat and cause a fire in the stud member 15.

As noted in FIGS. 27-30, the economical adjustable outlet box assembly 252 is provided with the keeper ring assembly 254 having keeper ring members 256. The keeper ring members 256 can be mounted within respective adjustment openings 72 in the connector tab sections 68, 70 of the variable ring member 56 and snapped therein due to the split ring construction. Each adjustable bolt member 258 having the ring groove section 272 is operable to be snapped within respective keeper ring members 256. Then, the threaded outer portions of the adjustable bolt members 258 are connected to threaded openings 54 in the box cover section 16 whereupon adjustment movement of the variable ring member 56 is noted on comparison of FIGS. 27 and 28.

In the method of application of the adjustable outlet box assembly 12 of this invention, it is noted that the process involves the following steps being (1) securing the outlet box member 14 in a conventional manner to a portion of stud member 15 or other support member; (2) connecting a cover box assembly 16 to the outlet box assembly 14; (3) mounting a variable depth ring assembly 18 through adjustment bolt members 110 to the receptacle box member 38; (4) connecting keeper plate members 76, 78 to respective upper and lower portions of the variable ring member 56; (5) adjusting the adjustment bolt members 110 inwardly and outwardly to position the variable ring member 56 in a desired position relative to the receptacle box member 38 considering the thickness of sheetrock or paneling 17 to be eventually installed thereabout; (6) installing an electrical receptacle assembly 20 within the variable ring member 56 having same connected to a power supply conduit 114; and (7) connecting a protective cover plate about the variable ring member 56 and the electrical receptacle assembly 20 with the protective cover plate being an electrical test cover assembly 190 or a temporary cover plate assembly 214.

After method step "(6)", and after all of the desired adjustable outlet box assemblies 12 have been positioned and a power circuit test lamp assembly 224 connected to each power inlet cord 226 in the electrical light fixture outlets normally found in the ceiling, the next step is to check the entire electrical circuitry of the building construction system.

The use of the electrical test cover assemblies 190 would give an immediate visual indication through the neon light members 212 as to whether the circuit was energized to a particular electrical outlet. Also, the power test lamp assemblies 224 will illuminate the test lights 248 if these circuits are energized.

After the sheetrock or paneling 17 has been installed, it is obvious that then the respective protective cover plate members can be removed to expose the adjustable outlet box assembly 12 as noted in FIG. 4. Then, the electrician can use a screwdriver on the respective adjustment bolt members 110 in each of the variable depth ring assemblies 18 so as to move the variable ring member 56 inwardly or outwardly as required to provide a proper depth adjustment of the outer surface of the respective variable ring members 56 relative to an outer surface of the sheetrock or paneling 17. This is an important feature of the invention to achieve this adjustment after the sheetrock or paneling 17 has been installed.

The importance of this adjustment feature also becomes very noticable when the specifications or, specifically, the thickness of the sheetrock or paneling 17 have been changed from the original construction blueprints. In those cases, considerable problems plus costs are involved to correct the situation in order to meet the fire code regulations. With the adjustable outlet box assemblies 12 of this invention, it is an easy matter to achieve the proper adjustment of the variable depth ring assembly 18 relative to the adjacent sheetrock or paneling 17.

Furthermore, another process step is the use of the power circuit test lamp assemblies 224 in order to check out the proper wiring in a three-way light fixture system which is difficult to correctly wire and, certainly, labor consuming and expensive to repair after the sheetrock or paneling 17 has been installed. The power circuit test lamp assemblies 224 would indicate through an illuminated test light 248 on movement of the various on/off switch members in a three-way lighting circuit whether the system was properly wired before installation of the sheetrock or paneling 17.

The final process step of this invention would be, after removal of the protective cover members, to install the proper cover plate member 116 on the respective receptacle members 112 to achieve the final installed condition as shown in FIG. 1.

It is seen that the adjustable outlet box assembly and method of application of this invention provides a means of installing an outlet box assembly with a box cover assembly mounted thereon in combination with a variable depth ring assembly which allows adjustment within limits to place the outer surface of the variable depth ring assembly flush or slightly outwardly from the adjacent portion of the sheetrock or paneling in order to meet or exceed fire code regulations. This is an important feature as fire code regulations require limited gaps or clearance between the adjacent flammable paneling or other such materials and such fire code regulations are overlooked in many circumstances.

The outlet box assebmly of this invention is relatively economical to manufacture, sturdy in construction, and easy to adjust without requiring highly skilled labor.

While the invention has been described in conjunction with preferred specific embodiments thereof, it will be understood this description is intended to illustrate and not to limit the scope of the invention, which is defined by the following claims:

I claim:

1. An adjustable outlet box assembly secured to a support member adapted to receive a cover panel material secured to the support member and abutting said adjustable outlet box assembly, comprising:
   (a) an outlet box assembly secured to the support member;
   (b) a box cover assembly connected to said outlet box assembly having a receptacle box member extended outwardly toward the to be installed cover panel material; and
   (c) a variable depth ring assembly having a variable ring member telescopingly mounted about said receptacle box member, a keeper plate assembly positioned adjacent said variable ring member, and a plate anchor assembly to anchor said keeper plate assembly against the variable ring member and adjustable connector means mounted between said keeper plate assembly and said variable ring member and engagable with said receptacle box member;

whereby said adjustable connector means is operable to move said variable ring member relative to said receptacle box member to place an outer surface of said variable ring member in a predetermined adjacent position relative to the cover panel member to be installed.

2. An adjustable outlet box assembly as described in claim 1, wherein:
   (a) said keeper plate assembly having a pair of keeper plate members secured respectively to upper and lower outer portions of said variable ring member.

3. An adjustable outlet box assembly as described in claim 2, wherein:
   (a) each of said keeper plate members having a threaded opening therein to receive a receptacle member to be attached thereto, a pair of spaced plate anchor holes with plate anchor screw to secure said keeper plate member to said variable ring member, and a pair of adjustment bolt openings therein to receive and engage said adjustable connector means held therein for positive movement outwardly of said variable ring member.

4. An adjustable outlet box assembly as described in claim 1, wherein:
   (a) said adjustable connector means including an adjustment bolt member operable on rotation in one direction to positively engage said variable ring member and move same in a direction toward said receptacle box member.

5. An adjustable outlet box assembly as described in claim 4, wherein:
   (a) said adjustment bolt member operable on rotation in a direction opposite said one direction to contact respective one of said keeper plate members to move said variable ring member in a direction outwardly from said receptacle box member.

6. An adjustable outlet box assembly as described in claim 1, including:
   (a) a receptacle member connected to a power supply member and mounted to said keeper plate assembly; and
   (b) a protective cover member mounted about said receptacle member and abutting said variable ring member in a sealed engagement to prevent dust and debris from entering thereto.

7. An adjustable outlet box assembly as described in claim 6, wherein:
   (a) said protective cover member having an outer periphery size equal to or less than a size of an outer periphery of said variable ring member;

whereby the size relationship of said protective cover member relative to said variable ring member allows for the cover panel material to be installed about said variable ring member without any interference therewith.

8. An adjustable outlet box assembly as described in claim 7, wherein:
   (a) after installation of the cover panel material, said protective cover member can be removed and said adjustable connector means can be operated to move said variable ring member inwardly or outwardly to place an outer surface thereof in a desired adjusted position relative to a parallel outer surface of the installed cover panel material.

9. An adjustable outlet box assembly as described in claim 1, wherein:
   (a) said keeper plate assembly being a clip-on keeper plate assembly having a main clip body to be clamped about a portion of said variable ring member and operable to secure and hold said adjustable connector means thereto; and
   (b) said adjustable connector means having an adjustment bolt member threadably connected to said receptacle box member for rotational movement to adjust the position of said variable ring member relative to said receptacle box member.

10. An adjustable outlet box assembly as described in claim 1, wherein:
    (a) said keeper plate assembly being a ring clip plate member which is attachable to said receptacle box member and having an anchor ear section to which variable ring member is connected by said adjustable connector means.

11. An adjustable outlet box assembly as described in claim 10, wherein:
    (a) said ring clip plate member having clip sections operable to connect to a portion of said receptacle box member.

12. An adjustable outlet box assembly as described in claim 1, wherein:
    (a) said variable ring member having a groove portion about an outer forward periphery thereof;

whereby said groove portion is adapted to receive a fireproof caulking material therein to seal against an adjacent portion of the cover panel material to form a fire control seal therebetween.

13. An adjustable outlet box assembly secured to a support member operable to receive a cover panel material mounted about said adjustable outlet box assembly, comprising:
    (a) a stud anchor plate assembly secured to the support member;
    (b) a variable depth ring assembly having a variable ring member connected to said stud anchor plate assembly by an adjustable connector means to position an outer surface thereof in a parallel adjacent, adjusted position relative to an outer surface of the cover panel material when installed.

14. An adjustable outlet box assembly as described in claim 13, wherein:
    (a) said stud anchor plate assembly having an anchor body member provided with a threaded opening thereof to receive an adjustment bolt member connected to said variable depth ring assembly to provide for the adjustable movement thereof on rotation of said adjustment bolt member.

15. An adjustable outlet box assembly as described in claim 13, wherein:
    (a) said variable depth ring member having a groove portion about an outer forward periphery area adapted to receive a caulking material thereon to provide a seal between said variable ring member and the cover panel material.

16. An adjustable outlet box assembly as described in claim 13, including:
    (a) an electrical receptacle member mounted against said variable ring member and connected to an electrical cable to supply electrical power thereto;
    (b) an electrical test cover assembly releasably connected to said electrical receptacle member; and
    (c) said electrical test cover assembly having a power test assembly which is engagable with said receptacle member and having an external visual signal member to indicate when an electrical power supply is presently available in said electrical receptacle member;
    whereby said electrical receptacle member can be connected to the electrical cable and checked through said visual signal member when receiving electrical power thereto and said electrical test cover assembly can remain on said variable ring member during application of the cover panel material thereabout to prevent dirt and debris from entering said variable ring member and cause contamination and possible electrical failure of the electrical receptacle member.

17. An adjustable outlet box assembly as described in claim 16, wherein:
    (a) said electrical test cover assembly having an outer periphery equal to or slightly less than the outer periphery of said variable ring member whereby dirt and debris cannot gain access to the interior of said variable ring member to cause electrical failure therein.

18. An adjustable outlet box assembly as described in claim 13, wherein:
    (a) said variable depth ring assembly includes a nonconductive electrical conduit box having an indent section at each corner thereof and said adjustable connector means is attached to said stud anchor plate assembly outside of the interior of said variable ring member to prevent electrical shorting with said adjustable connector means thus providing a fire safety feature.

19. An adjustable outlet box assembly as described in claim 13, including:
    (a) a temporary plate cover assembly having a cover plate member releasably connected to said variable ring member to enclose an electrical outlet switch member and hold a switch portion thereof in the on or off condition to provide a safety feature and prevent dirt and debris from entering said variable ring member.

20. An adjustable outlet box assembly secured to a support member adapted to receive a cover panel material secured to the support member and abutting said adjustable outlet box assembly, comprising:
    (a) an outlet box assembly secured to the support member;
    (b) a box cover assembly connected to said outlet box assembly having a receptacle box member extended outwardly toward the cover panel material;
    (c) a variable depth ring assembly adjustably connected to said receptacle box member for lateral movement relative thereto;
    (d) said variable depth ring assembly having a variable ring member with a keeper ring assembly connected thereto;
    (e) said keeper ring assembly having at least one keeper ring member having a ring body member with a bolt opening provided therein;
    (f) said keeper ring member mounted within a respective adjustment opening in said variable ring member and engagable with opposite sides of said variable ring member about said adjustment opening; and
    (g) an adjustable bolt member mounted through said bolt opening in said keeper ring member and engagable with a threaded opening in said box cover assembly operable to move said variable depth ring assembly on rotation of said adjustable bolt member to position an outer surface of said variable depth ring assembly to a desired plane relative to the cover panel material when installed.

21. An adjustable outlet box assembly as described in claim 20, wherein:
    (a) said keeper ring member having a ring groove section engaged with said adjustable bolt member to restrict axial movement in either direction without conjoint movement of said keeper ring member and said variable ring member;
    whereby rotation of said adjustable bolt member engages said ring groove section and operable to achieve movement of said variable depth ring assembly relative to said box cover assembly.

22. An adjustable outlet box assembly secured to a support member adapted to receive a cover panel material secured to the support member and abutting said adjustable outlet box assembly, comprising:
    (a) an outlet box assembly secured to a support member;
    (b) a box cover assembly connected to said outlet box assembly having a receptacle box member extended outwardly toward the cover panel material;
    (c) a variable depth ring member having a variable ring member telescopingly mounted about said box member; and
    (d) a power circuit test lamp assembly mounted within said variable ring assembly and connected to a power inlet cord having a test lamp member thereon;
    whereby energization of the power inlet cord acts to illuminate said test lamp member to indicate the presence of a power supply thereto.

23. An adjustable outlet box assembly as described in claim 22, wherein:
    (a) said power circuit test lamp assembly includes a test lamp member within a main housing having a cord anchor assembly mounted therein; and
    (b) said cord anchor assembly includes connector prongs to engage the power inlet cord, a connector block positioned above said connector prongs, and an actuator button engagable with said connector block to electrically connect said connector prongs to the power inlet cord to provide an electrical circuit to the test light assembly to indicate when electrical power is present;

whereby said test lamp member is operable to be attached to an electrical circuit prior to installation of the cover panel material and especially desirable to check out three-way light fixture systems.

24. A method of installing and testing electrical circuits in a building construction system prior to installation of a cover panel material over a wall and ceiling support assembly thereto, comprising the steps of:
  (a) connecting an outlet box assembly to a support member;
  (b) securing a box cover assembly to said outlet box assembly having a receptacle box member projected toward a plane to be occupied by the cover panel material;
  (c) connecting a variable depth ring assembly to said cover box assembly having a variable ring member which can be adjustably movable relative to said receptacle box member;
  (d) mounting an electrical power supply through said electrical box member, said box cover assembly, and into the interior of said variable depth ring assembly;
  (e) connecting the electrical power supply to an electrical receptacle member mounted against said variable depth ring assembly;
  (f) testing the electrical circuit to see whether power supply is available to said electrical receptacle member; and
  (g) covering said electrical receptacle member with a protective cover member mounted against and about said variable depth ring member to provide a seal therewith to prevent contact with the electrical power supply and said electrical receptacle member;

whereby the cover panel material can then be secured against the support member and about the variable ring member without hinderance thereto to complete the next step of construction.

25. A method of the construction process as described in claim 24, wherein:
  (a) removing said protective cover member from said electrical receptacle member;
  (b) adjusting the position of said variable ring member relative to the installed cover panel material to place on outer portion thereof in an adjacent parallel plane with the cover panel material to meet fire safety codes; and
  (c) after adjusting said variable ring member, placing a receptacle cover member on said electrical receptacle member to present a completed electrical receptacle installation.

26. A method of the construction process as described in claim 24, including:
  (a) mounting an electrical test cover assembly on said variable ring member having a visual signal member thereon; and
  (b) observing said visual signal member to ascertain whether an electrical power supply is available to said electrical receptacle member.

27. A method of the construction process as described in claim 24, including:
  (a) securing a power circuit test lamp assembly to the power inlet cord being readily attachable thereto with said power circuit test lamp assembly having a visual signal thereon; and
  (b) observing said visual signal assembly to ascertain whether electrical power is supplied thereto;

whereby said power circuit test assembly is operable to be readily attached and detached from a power inlet cord member and to provide a visual signal of electrical power being supplied and especially usable when testing three-way lamp fixtures for correct electrical wiring problems prior to installation of the cover panel material.

28. An adjustable outlet box assembly secured to a support member adapted to receive a cover panel material secured to the support member and abutting said adjustable outlet box assembly, comprising:
  (a) an outlet box assembly secured to the support member;
  (b) a box cover assembly connected to said outlet box assembly having a receptacle box member extended outwardly toward the to be installed cover panel material; and
  (c) a variable depth ring assembly having a variable ring member telescopingly mounted about said receptacle box member, a keeper plate assembly connected to said variable ring member, and adjustable connector means mounted between said keeper plate assembly and said variable ring member and engagable with said receptacle box member;

whereby said adjustable connector means is operable to move said variable ring member relative to said receptacle box member to place an outer surface of said variable ring member in a predetermined adjacent position relative to the cover panel member to be installed.

29. A method of installing and testing electrical circuits in a building construction system prior to installation of a cover panel material over a wall and ceiling support assembly thereto, comprising the steps of:
  (a) connecting an outlet box assembly to a support member;
  (b) securing a box cover assembly to said outlet box assembly having a receptacle box member projected toward a plane to be occupied by the cover panel material;
  (c) connecting a variable depth ring assembly to said cover box assembly having a variable ring member telescopingly mounted about said receptacle box member which can be adjustably movable relative to said receptacle box member;
  (d) mounting an electrical power supply through said electrical box cover assembly, and into the interior of said variable depth ring assembly;
  (e) connecting the electrical power supply to an electrical receptacle member mounted against said variable depth ring assembly;
  (f) testing the electrical circuit to see whether power supply is available to said electrical receptacle member; and
  (g) covering said electrical receptacle member with a protective cover member mounted against and about said variable depth ring member to provide a seal therewith to prevent contact with the electrical power supply and said electrical receptacle member;

whereby the cover panel material can then be secured against the support member and about the variable depth ring member without hinderance thereto to complete the next step of construction.

30. A method of the construction process as described in claim 29, wherein:
(a) removing said protective cover member from said electrical receptacle member to reveal said variable ring member; and
(b) adjusting the position of said variable ring member relative to said receptacle box member to place an outer surface in an adjacent plane with the cover panel material to meet fire safety codes.

31. A method of the construction process as described in claim 29, wherein:
(a) mounting an electrical test cover assembly on said variable ring member having a visual signal member being operably connected to said electrical receptacle member; and
(b) observing said visual signal member to ascertain whether said electrical receptacle member is electrically energized.

32. A method of the construction process as described in claim 31, wherein:
(a) securing a power current test lamp assembly having a visual signal assembly thereon to a power inlet cord; and
(b) observing said visual signal assembly to ascertain whether electrical power is supplied thereto.

33. A method of the construction process as described in claim 32, wherein:
(a) securing a plurality of electrical test cover assemblies and said power circuit test assemblies to respective ones of said variable ring assemblies and electrically connected to said electrical receptacle members; and
(b) observing said visual signal assemblies and visual signal members during an electrical inspection prior to installation of the cover panel material to ascertain whether proper electrical installation has been achieved.

* * * * *